United States Patent [19]
Stephenson

[11] Patent Number: 5,887,381
[45] Date of Patent: Mar. 30, 1999

[54] FISHING RIG

[76] Inventor: Timothy L. Stephenson, 6903 Innesbrook Way, Bahama, N.C. 27503

[21] Appl. No.: 900,464

[22] Filed: Jul. 2, 1997

[51] Int. Cl.$^6$ .................................................... A01K 95/00
[52] U.S. Cl. ...................... 43/43.15; 43/44.87; 43/44.96
[58] Field of Search ................... 43/43.1, 43.15, 43/44.87, 43.14, 44.9, 44.96, 44.97, 44.98, 42.31, 42.39, 44.81, 44.83

[56] References Cited

U.S. PATENT DOCUMENTS

| | | | |
|---|---|---|---|
| 2,766,549 | 10/1956 | Dickerson | 43/44.98 |
| 3,461,597 | 8/1969 | Hobson | 43/44.97 |
| 3,771,252 | 11/1973 | Odenwald | 43/44.97 |
| 4,416,080 | 11/1983 | Morrissette | 43/42.31 |
| 4,888,909 | 12/1989 | Adams | 43/42.39 |

*Primary Examiner*—Jack W. Lavinder
*Attorney, Agent, or Firm*—Olive & Olive

[57] ABSTRACT

The fishing rig of the present invention is an assembly of a round cylindrical weight and two beads threaded on a stiff wire member. The cylindrical weight has two flat ends and an axial hole perpendicular thereto. The wire member is made with a free length of about 3 times the length of the weight. By the unique shape of the weight, the stiffness of the wire and the ratio of length of the wire to the weight, a fishing rig which casts more accurately and which gets snagged on underwater obstructions less frequently is achieved.

1 Claim, 2 Drawing Sheets

FISHING RIG

BACKGROUND OF THE INVENTION

1. Field of the Invention

This invention relates to fishing rigs, and more particularly to fishing rigs which rest on the bottom beneath the water and attract the fish primarily by sound.

2. Description of the Related Art

Bass fishing, to which the invention disclosed is mainly directed, typically involves the use of a "rig" which is tied on one's fishing line intermediate the reel and the hook. The rig, often referred to as a "Carolina" rig, is a fishing aid in which a piece of relatively long flexible leader line runs loosely through a bullet-shaped weight and a pair of glass or plastic beads. A further length of flexible leader line with a hook is connected to one end of the rig and the other end is tied to the line which is wound onto the reel. The line is cast over the water with the aid of a fishing rod to drop the hook and rig in the water at or near a desired spot. The bullet-shaped weight remains on the bottom of the lake, and as the person fishing works the rod, the beads in the "Carolina" rig hit the end of the weight and make a clacking noise. This is why the rig is sometimes known as a "clacker." A fishing rig of the type described is currently sold by Kalin Company of Brawley, Calif., although many fishing enthusiasts assemble their own rigs of a generally similar description.

Although the known rig is a popular fishing aid, especially in bass fishing, there are certain problems which are frequently encountered in its use. It has been found, for example, that with a known rig attached to a fishing line, casting is difficult and inaccurate. The described rig tends to be aerodynamically unstable in flight and it will wobble and spin end over end so that one cannot cast predictably to a desired spot. Also, when the known rig is being reeled in to cast again, it is prone to being caught on underwater objects, such as logs or rocks. Once caught, the fishing line is typically broken and a new rig must be assembled to the line to continue the day's fishing. It is not uncommon to lose more than one of this type rig during each day of fishing.

It is therefore an object of this invention to provide a fishing rig which is able to attract fish by producing a clacking sound but is unlikely to be caught on underwater objects and lost.

It is an additional object of this invention to provide a fishing rig which is reliable and accurate in casting.

Other objects and advantages will be more fully apparent from the following disclosure and appended claims.

SUMMARY OF THE INVENTION

The present invention provides a fishing rig with a weight having two parallel, planar ends. The flat ended weight is mounted on a relatively short and relatively stiff wire member which passes through a hole in the weight which runs from one flat end to the other. A single bead is placed on the wire member on either side of the weight and the wire is formed into a loop at each end. The flexible fishing line from the reel is knotted to one end loop of the relatively stiff wire member of the fishing rig of the invention and a flexible leader line with a hook is connected to the other end loop. The operational properties of the fishing rig disclosed are substantially improved over those of the known art.

DETAILED DESCRIPTION OF THE INVENTION

Figure 1:
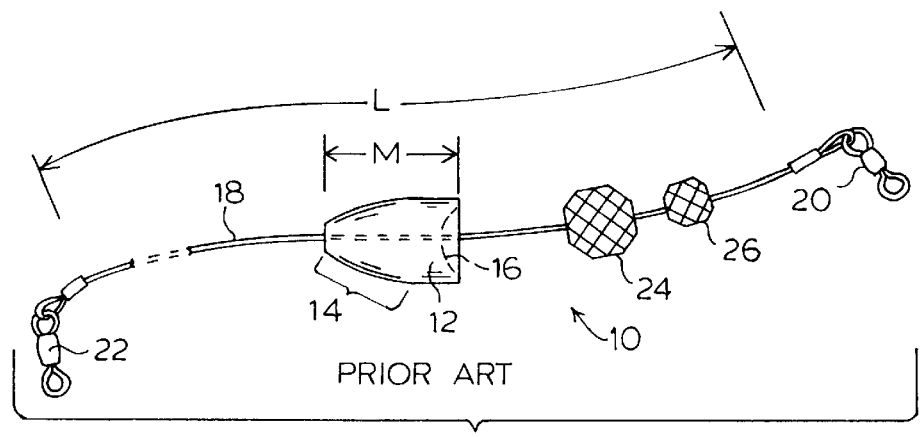
FIG. 1 is a side view of a fishing rig of the prior art.

According to the illustration of FIG. 1, a typical fishing rig 10 of the prior art includes a bullet-shaped weight 12, a flexible leader line 18, and a pair of glass or dense plastic beads 24 and 26. Weight 12 has tapered nose section 14 and a concave rear section 16. Length L of the flexible leader line 18 is typically on the order of 10 times the length M of weight 12. Swivel connectors 20 and 22 are connected to either end of leader line 18.

Figure 2:
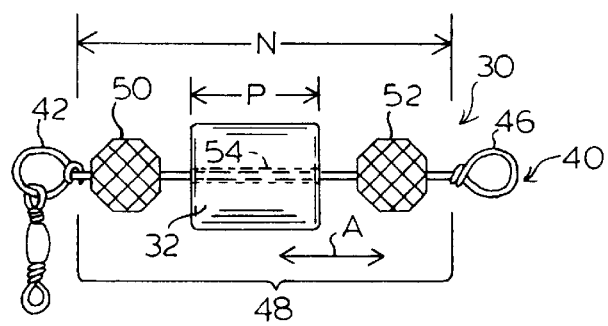
FIG. 2 is a side view of the fishing rig of the present invention.

Referring now to FIG. 2, a side illustration of the fishing rig 30 of the present invention shows a grouping of components configured and assembled in a manner to accomplish the goals noted above. Weight 32 is formed as a right circular cylinder and is mounted on a relatively short and stiff wire member 40 in a manner to permit free sliding thereupon in a direction shown by arrow A. Weight 32 is made of brass to resist rust, while providing greater mechanical strength and durability than lead (from which fishing weights are often made). Use of other rust-resistant, dense materials would also serve the objects of the invention. Wire member 40 is formed of a substantially stiff wire material with central segment 48 being straight. Loops 42 and 46 on either end of segment 48 are formed by known methods. A preferred wire according to the preferred embodiment is a stainless steel wire of approximately 1.1 mm (0.043 inch) diameter. A pair of glass or dense plastic beads 50 and 52 are slidingly mounted on wire member 40 with one such bead positioned on either side of weight 32 and between respective wire loops 42 and 46. The length N of straight, central portion 48 of wire leader 40 is on the order of between 2–4 times, but most preferably 3 times, the length P of weight 32. Beads 50 and 52 are each about ½ the length of weight 32. When wire member 40 moves through weight 32, a glass bead 50 or 52 strikes the closer side of weight 32 and a clacking noise is emitted. This noise may be heard by bass or other fish which are attracted to it since sound travels better through water than through air. A flexible fishing line (not shown) is connected to either end loop 42, 46 of fishing rig 30, one end going to the reel and the other end, typically a leader, to the hook.

Figure 3:
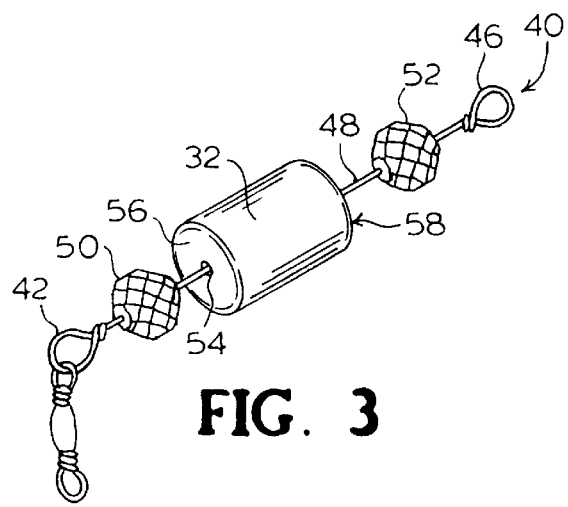
FIG. 3 is a perspective view of the fishing rig of the present invention.

FIG. 3 illustrates fishing rig 30, especially weight 32, of the present invention in perspective view. Although weight 32 is formed as a right circular cylinder in the preferred embodiment, other cross sectional shapes, for example, hexagonal, would perform the functions required. Thus, it is recognized that a substantially uniform circumference of weight 32 from end 56 to end 58, and more particularly that ends 56 and 58 are substantially equal, is focal to the present invention. However, the presence of planar surfaces at both ends of weight 32 has been found to be a preferred feature as later explained. An axially oriented hole 54 is formed through weight 32 from planar end 56 to planar end 58, both ends being substantially equal in diameter and parallel to each other. Hole 54 is formed with a diameter sufficient to allow weight 32 to slide freely on wire member 40.

Figure 4:
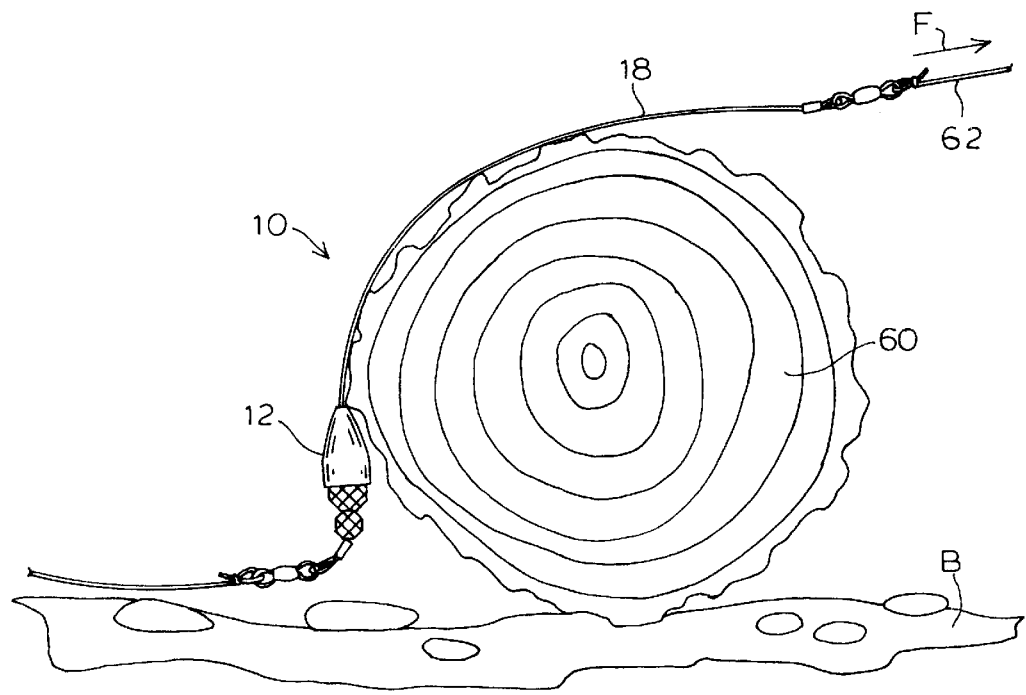
FIG. 4 is a side schematic illustration of a prior art rig which has been caught on an underwater obstruction.
Figure 5:
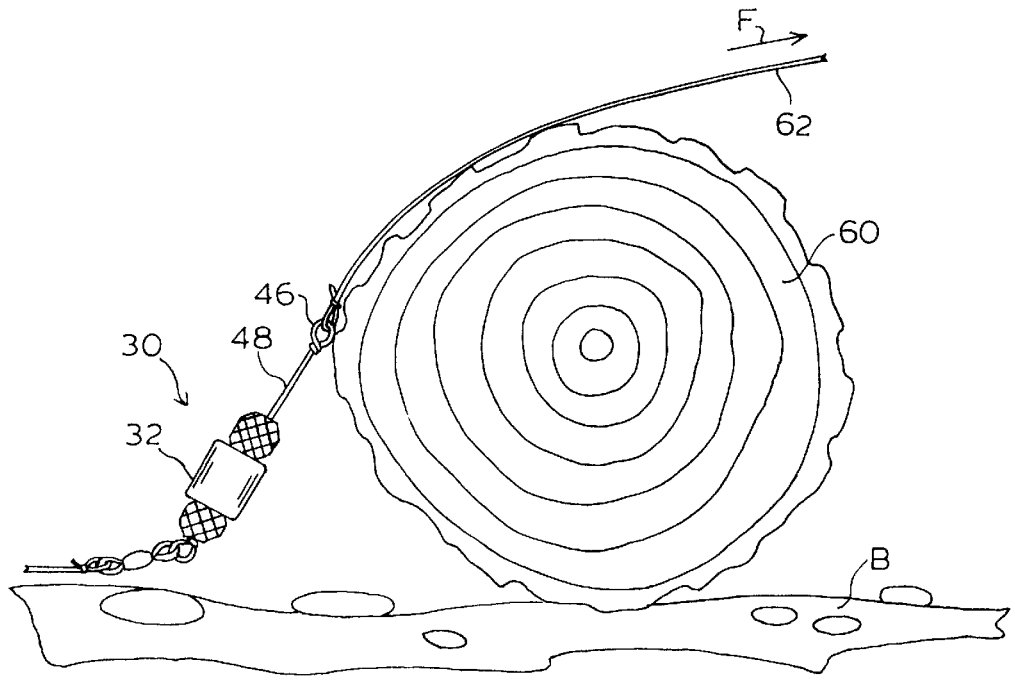
FIG. 5 is a side schematic illustration of the rig of the present invention being pulled over an underwater obstruction without being caught.

The operation of the fishing rigs of the prior art and the present invention with regard to their respective ability to pass over underwater obstructions is seen by a comparison of FIGS. 4 and 5. Referring first to FIG. 4, prior art fishing rig 10 is shown being pulled over underwater obstruction 60 by a force operative in the direction indicated by arrow F. Since leader 18 is substantially flexible, it tends to wrap somewhat closely around log 60, causing bullet-shaped weight 12 to essentially crawl around the periphery of log 60. When weight 12 encounters a protrusion on log 60, weight 12 tends to get caught. If one pulls on line 62, the line will frequently break free of fishing rig 10, and a new fishing rig must be assembled to line 62.

Referring next to FIG. 5, it is seen that the fishing rig 30 of the invention behaves differently than prior art fishing rig 10 when rig 30 encounters an underwater obstruction. Because of its stiff and short wire member central portion 48, the leading end 46 of fishing rig 30 lifts off the bottom surface B before weight 32 comes into contact with log 60 as fishing line 62 is being reeled in. Thus, fishing rig 30 of the invention tends not to become ensnared, and needs replacement considerably less frequently than known prior art fishing rigs. Through field evaluation of the preferred embodiment shown and described, it has been found that dozens of fishing days will pass without one fishing rig being lost. In addition, the object of improvement of the accuracy of casting was attained through a reduction in wobble and spin in the air.

While the invention has been described with reference to specific embodiments thereof, it will be appreciated that numerous variations, modifications, and embodiments are possible, and accordingly, all such variations, modifications, and embodiments are to be regarded as being within the spirit and scope of the invention.

What is claimed is:

1. A fishing rig adapted to be attached to a fishing line, comprising:

(a) a bare cylindrical weight of substantially uniform circumference and constant diameter along its length having a hole formed along a central axis thereof and extending between first and second substantially parallel planar ends substantially perpendicular to said axis of said weight, wherein when attached between a leader line and a flexible fishing line and after said fishing rig is cast said weight resides on the bottom of a lake;

(b) a substantially stiff wire member freely slidingly mounted in said hole and having end portions extending outwardly of said ends of said weight and terminating in the form of a pair of loops operative to limit travel of said weight on said wire member and to provide a means for connecting other lines to said end portions;

(c) a pair of beads for making a clacking noise when said beads strike said weight and formed of substantially dense material slidingly mounted on said wire member and between which said weight is mounted;

(d) wherein the portion of said wire member measured between said loops is approximately 2–4 times the length of said weight between the said first and second ends thereof: and (e) a leader line having a first end attached to an opposite one of said loops and a second end attached to a hook, wherein said weight and said hook are separated by said leader line and wherein after said fishing rig is cast, said hook is caused to be positioned above said weight residing on the bottom of a lake.

* * * * *

UNITED STATES PATENT AND TRADEMARK OFFICE
CERTIFICATE OF CORRECTION

PATENT NO. : 5,887,381

DATED : March 30, 1999

INVENTOR(S) : Timothy L. Stephenson

It is certified that error appears in the above-identified patent and that said Letters Patent is hereby corrected as shown below:

Column 4, line 27, delete "an opposite". (Applicant error)

Signed and Sealed this

Sixteenth Day of May, 2000

Attest:

Q. TODD DICKINSON

*Attesting Officer*      *Director of Patents and Trademarks*